Patented Aug. 13, 1940

2,211,152

UNITED STATES PATENT OFFICE 2,211,152

SUBSTITUTED ALPHA-AMINO-ACRYLIC ACID NITRILES

Otto Nicodemus, Heinrich Lange, and Herbert Kranz, Frankfort-on-the-Main, Germany, assignors, by mesne assignments, to General Aniline & Film Corporation, New York, N. Y., a corporation of Delaware No Drawing. Application February 1, 1939, Serial No. 254,006. In Germany February 3, 1938

3 Claims. (Cl. 260—293)

The present invention relates to substituted α-amino-acrylic acid nitriles.

We have found that substituted α-aminoacrylic acid nitriles may be obtained in a good yield from β-halogen-acetaldehyde-cyanhydrins by the action of aliphatic secondary bases. The course of this novel reaction is surprising. It was expected that not only the hydroxyl group but also the halogen would be exchanged for an amino-group. This does not occur, however, but the amine removes hydrogen halide at the same time that it takes the place of the hydroxyl group. There are thus produced the hitherto unknown compounds of the formula

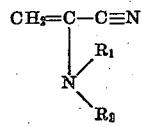

wherein $R_1$ and $R_2$ stand for alkyl groups or $R_1$ and $R_2$ together stand for an alkylene group.

The amine residue must be in α-position because during the treatment of for instance α-dimethylamino-acrylic acid nitrile with water with separation of hydrocyanic acid, dimethylacetamide can be obtained in a yield of more than 50 per cent. The formation of the amide is possible only if the parent material is an α-aminonitrile.

The α-dialkylamino-acrylic acid nitriles are valuable intermediate products for pharmaceutical purposes, for adjuvants in the textile industry and for making artificial materials.

The following examples serve to illustrate the invention but they are not intended to limit it thereto:

1. 270 grams of dimethylamine in an aqueous solution of 52 per cent strength are added, drop by drop while vigorously stirring, to 211 grams of α-hydroxy-β-chloropropionitrile (obtainable by the reaction of β-chloracetaldehyde with anhydrous hydrocyanic acid in the presence of a small proportion of potassium cyanide and distillation under reduced pressure with neutralization of the alkali), in an aqueous solution of 90 per cent strength. By cooling, the temperature in the flask is kept between 0° C. and +5° C. After 2 hours the reaction is complete. Two layers are formed. The top layer, which is of a light color, is separated, dried and distilled under reduced pressure. 127.5 grams of α-dimethylaminoacrylic acid nitrile distil between 63° C. and 64° C. under a pressure of mercury of 40 millimeters. The yield amounts to 66.5 per cent. From the aqueous bottom layer further small quantities of nitrile may be obtained by known processes. As a by-product dimethylacetamide is obtained. The nitrile is a limpid readily mobile liquid which on exposure to the air gradually becomes slightly colored. It has a strong odour of benzaldehyde. It is readily soluble in the usual organic solvents, but sparingly soluble in water. At 22° C. its specific gravity is 0.900. The nitrile may also be distilled at ordinary pressure without an essential loss. Boiling point: 148.5° C. under a pressure of 759 millimeters.

2. 540 cc. of a solution obtainable by stirring 160 cc. of anhydrous hydrocyanic acid to which a small proportion of potassium cyanide has been added, together with 300 grams of chloracetaldehyde in 300 cc. of water at a temperature not above +7° C., are introduced, drop by drop, into 1210 cc. of an aqueous solution of 52 per cent strength of dimethylamine. The temperature in the flask is kept between 0° C. and +5° C. by cooling. After 1½ hours the reaction is complete. Two layers are formed; the top layer is separated, dried and distilled under reduced pressure. 204.2 grams of α-dimethylamino-acrylic acid nitrile are obtained which distils between 62° C. and 64° C. under a pressure of 400 millimeters. The yield amounts to 56.7 per cent.

3. A solution of 420 grams of distilled α-hydroxy-β-chloropropionitrile, obtainable as described in Example 1, in 340 cc. of water is added drop by drop, while stirring, to a mixture of 800 grams of piperidine and 600 cc. of water. The temperature in the flask is kept between 25° C. and 30° C. by cooling. After 2 hours two layers are formed. The oily, feebly yellow top layer is separated, dried and distilled under reduced pressure. From the aqueous, only feebly turbid bottom layer further small quantities of the reaction product may be obtained by known processes. In this manner 379 grams of piperidyl-acrylic acid nitrile are obtained which distil between about 88° C. and about 89° C. under a pressure of 9 millimeters. The yield amounts to 70 per cent. The α-piperidyl-acrylic acid nitrile is a limpid readily mobile liquid which sparingly dissolves in water and readily dissolves in the usual organic solvents. It has a characteristic odour. At 20° C. its specific gravity is 0.9703. At room temperature the product gradually changes color whereas it remains completely unaltered below 0° C. like the α-dimethylamino-acrylic acid nitrile prepared according to Examples 1 and 2. At ordinary temperature it may only be distilled with a strong decomposition.

We claim:
1. The compounds of the following formula

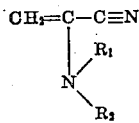

wherein $R_1$ and $R_2$ stand for radicals of the group consisting of alkyl radicals and alkylene radicals formed by $R_1$ and $R_2$ together.

2. The $\alpha$-dimethylamino-acrylic acid nitrile, having a boiling point of about 148.5° C. under a pressure of 759 millimeters.

3. The $\alpha$-piperidyl-acrylic acid nitrile, having a boiling point between about 88° C. and 89° C. under a pressure of 9 millimeters.

OTTO NICODEMUS.
HEINRICH LANGE.
HERBERT KRANZ.